United States Patent [19]

Geropp et al.

[11] Patent Number: 4,758,260
[45] Date of Patent: Jul. 19, 1988

[54] PROCESS AND DEVICE FOR PRODUCING GRANULATED SLAG SAND FROM BLAST FURNACE SLAG

[75] Inventors: Dieter Geropp, Winsdorf-Obersdorf; Karl Wiedemer, Seigen; Konrad Muller, Freudenberg-Overfischbach, all of Fed. Rep. of Germany

[73] Assignee: AJO Stahlbau GmbH & Co. KG, Freudenberg-Oberfischbach, Fed. Rep. of Germany

[21] Appl. No.: 4,475
[22] PCT Filed: Mar. 22, 1986
[86] PCT No.: PCT/DE86/00124
   § 371 Date: Dec. 2, 1986
   § 102(e) Date: Dec. 2, 1986
[87] PCT Pub. No.: WO86/05818
   PCT Pub. Date: Oct. 9, 1986

[30] Foreign Application Priority Data

Apr. 2, 1985 [DE] Fed. Rep. of Germany ....... 3511958

[51] Int. Cl.$^4$ .............................................. C03B 19/00
[52] U.S. Cl. ......................................... 65/19; 65/141; 75/24
[58] Field of Search ................. 65/19, 20, 141; 75/24; 55/220, 226

[56] References Cited

U.S. PATENT DOCUMENTS

| | | | |
|---|---|---|---|
| 3,695,004 | 10/1972 | DeLisio et al. | 55/226 X |
| 3,738,820 | 6/1973 | Osborne et al. | 65/19 |
| 3,912,487 | 10/1975 | Sharanov et al. | 65/19 X |
| 4,209,313 | 6/1980 | Lynn et al. | 65/19 |

FOREIGN PATENT DOCUMENTS

| | | |
|---|---|---|
| 1583949 | 9/1973 | Fed. Rep. of Germany . |
| 2260924 | 4/1975 | Fed. Rep. of Germany . |
| 2749143 | 5/1979 | Fed. Rep. of Germany . |
| 2807441 | 7/1979 | Fed. Rep. of Germany . |
| 2911903 | 4/1980 | Fed. Rep. of Germany . |
| 2108805 | 5/1972 | France . |
| 2274690 | 1/1976 | France . |
| 2353034 | 12/1977 | France . |
| 2488910 | 2/1982 | France . |
| 178725 | 1/1966 | U.S.S.R. . |

OTHER PUBLICATIONS

Suzuki, Patent Abstracts of Japan, vol. 2, No. 43, Mar. 23, 1978, p. 4953 C 77.

Primary Examiner—Robert L. Lindsay
Attorney, Agent, or Firm—Browdy and Neimark

[57] ABSTRACT

In order to reduce or avoid the discharge of gaseous pollutants $H_2S$ and $SO_2$ to the environment in a process for the production of slag sand (granules) from blast-furnace slag by granulation of the slag by means of a water jet, the propulsion jet interspersed with water vapor, granules and pollutants is injected directly into a water receiver, the residual vapor still remaining and the pollutants $H_2S$ and $SO_2$ not yet washed out are cooled down in a condenser in counter-current with spray water and condensed, and the residual gas remaining after the vapor condensation is taken off from the top end of the condenser and recycled via a recycle line back to the injector.

14 Claims, 2 Drawing Sheets

PROCESS AND DEVICE FOR PRODUCING GRANULATED SLAG SAND FROM BLAST FURNACE SLAG

BACKGROUND OF THE INVENTION

The invention relates to a process for the production of slag sand (granules) from blast-furnace slag by granulation of the slag by means of jetting water in a spray head into the slage jet, the resulting granules/water mixture being dewatered in a downstream dewatering unit, the granules being fed to a distribution unit and the process water, after making up the losses caused by vaporization and the residual moisture remaining in the granules, being recycled to the spray head and the vapours and gases formed on granulation being collected in a space above a granules/water mixture receiver, and to advantageous equipment for carrying out the process.

It is known that, in the conversion of iron ore to crude iron in a blast-furnace, blast-furnace slag is formed to a considerable extent in addition to the molten crude iron. On each tapping, a quantity of slag is formed, the weight of which corresponds to approximately one third of the weight of the crude iron, whereas the volume fraction of the slag, because of the lower density of the slag, is greater than the volume fraction of crude iron.

Various processes are known for producing high-grade granules with a high percentage of glassy constituents, uniform grain structure and good grindability from blast-furnace slag by granulation of the molten slag directly at the blast-furnace. The granules formed can then be put into intermediate storage for further processing into building materials and transported away.

An important step in the processing of the granules is dewatering. For this purpose, various processes and types of equipment are known (German Patent Specification No. 1,583,949, German Patent Specification No. 2,260,924) as well as modern dewatering machines with bucket wheels, wherein the slag sand/water mixture is dewatered to a low residual moisture content and the process water is recycled for reuse (German Offenlegungsschrift No. 2,749,143, German Offenlegungsschrift No. 2,807,441 and German Offenlegungsschrift No. 2,911,903). In these known processes, the slag granulation was effected by spraying the molten slag at about 1500° C. by means of a propulsion jet, consisting of many individual jets, from a spray head at a temperature of 35°–40° C. and thus processing it to give fine granules. The water vapour arising in this process contains large quantities of $H_2S$ and $H_2O$, in particular when sulphur-containing ores are used. The fractions of the pollutants $H_2S$ and $SO_2$ contained in the water vapour formed on quenching of the slag have hitherto been discharged in the vapour via a stack.

SUMMARY OF THE INVENTION

By contrast, it is the object of the invention to develop a process of the type explained above in such a way that the fractions of the pollutants $H_2S$ and $SO_2$ are separated off or dissolved in the water.

According to the invention, this object is achieved essentially in such a way that the water propulsion jet is introduced directly into a water receiver, that vapours and gases thus arising are partially condensed in the water receiver and the residual vapour and the residual gases are sprayed with water and thus condensed, and that the residual gases then still remaining are recycled back to the spray head.

As a result of the measures according to the invention, the propulsion jet with added water vapour gases and granules is sprayed directly into a large water receiver. The impulse introduced into the water receiver with the propulsion jet then ensures intensive mixing and at the same time improved heat release. In a condenser above the water receiver, the residual vapour still remaining and the $H_2S$ and $SO_2$ pollutants not yet washed out are cooled in counter-current with spray water and condensed, absorbed by the water and transferred to the lime present in the cooling water in conjunction with an oxidation potential. The water jetted into the condenser is, in conjunction with the absorbed pollutants from the vapours and gases, fed via a pumping station and the cooling tower to the injector. During the granulation process taking place therein, the gypsum particles formed are attached to the granules produced and are discharged with the granules.

The residual gas, which remains after the vapour condensation and consists of air and residual traces of $H_2S$ and $SO_2$, is taken off from the top end of the condenser and recycled to the injector via the recycle line, so that eventually a steady gas circulation is established. Since no fresh air is used for the granulation injector, the otherwise unavoidable waste gas stream is reduced to zero.

The invention also relates to equipment for the production of slag sand (granules) from blast-furnace slag by granulation of the slag, with a slag runner for feeding the blast-furnace slag to an injector (spray head), by means of which water is jetted into the slag jet, a granules collection vessel with downstream dewatering devices and a stack, arranged above the granules collection vessel, for receiving the vapours and gases formed during the granulation process, especially for carrying out the process according to the invention.

According to the invention, the stack in such equipment is designed as a condenser, with a plate valve in an exhaust, spray nozzles for spraying the vapours and the gases from the receiver are provided, and a recycle line for residual gas to the injector is located at the top end of the condenser.

It is particularly advantageous if, according to a further development of the invention, a restrictor flap is provided in the recycle line.

It is also advantageous, in order to prevent an implosion, to fit a reduced-pressure valve in the recycle line.

According to a further advantageous embodiment of the invention, one or more water collection channels is provided in the condenser.

It is particularly advantageous if the spray nozzles are fitted in several rows one above the other on the shell of the condenser.

BRIEF DESCRIPTION OF THE DRAWINGS

Measures of the process according to the invention and features of the equipment according to the invention as well as their advantages are explained in more detail by reference to the drawings in which.

DESCRIPTION OF THE PREFERRED EMBODIMENTS

Figure 1:
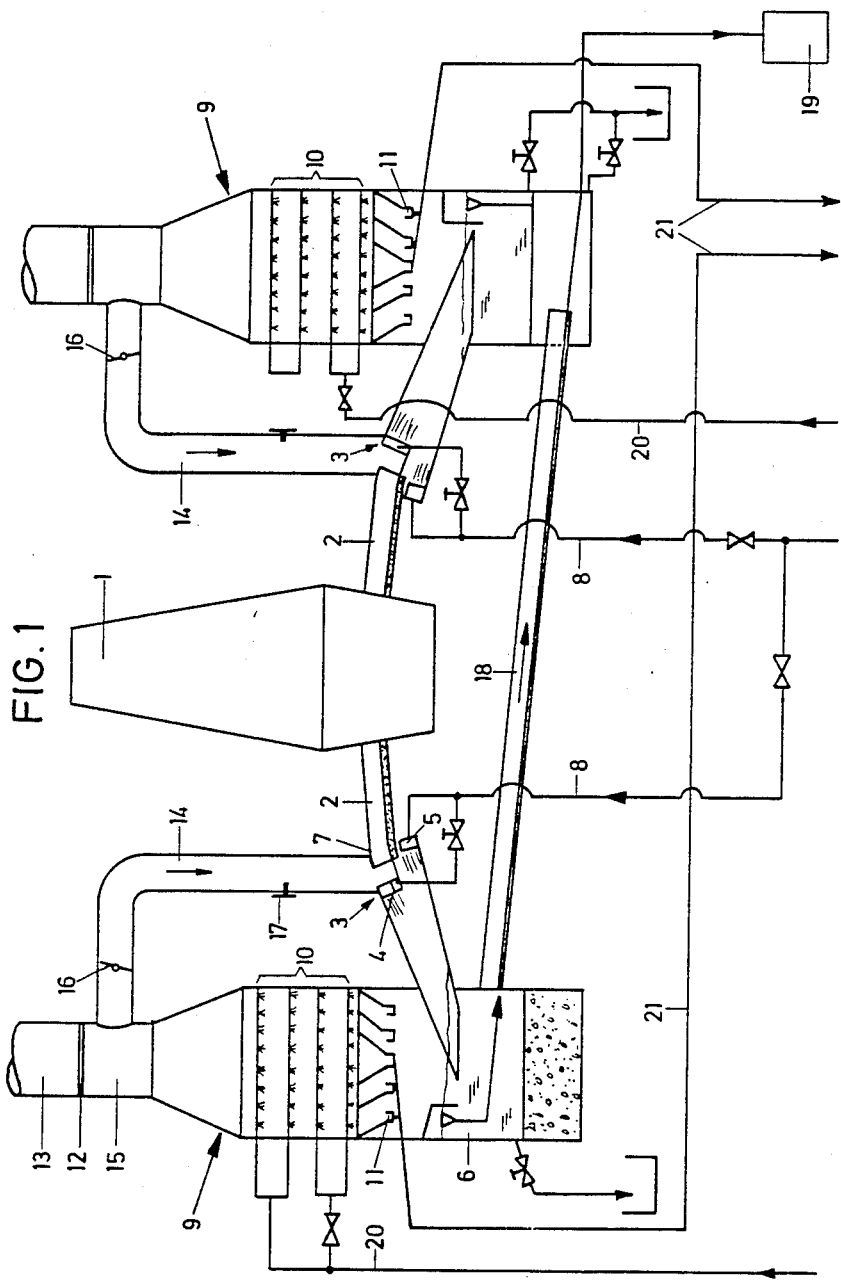
FIG. 1 shows a flow diagram of a slag granulation unit.

The flow diagram of a slag granulation unit according to FIG. 1 shows that the molten slag coming from a blast-furnace 1 is passed via a slag runner 2 to an injector 4 with a spray head 3 and a nozzle head 5. In the illustrative embodiment shown in FIG. 1, two granulation devices are provided which are constructed in the same way and in which the various reactions proceed similarly, so that only one granulation device is described below.

At the end of the runner 2, the slag drops through an opening into the injector 4. The propulsion jet coming from the nozzle head 5 picks up the slag and accelerates it in the direction of a receiver 6. The nozzle head 5 of the injector 4 consists essentially of a nozzle plate with a multiplicity of nozzles of relatively small diameter.

The open-topped profile of the propulsion jet of the nozzle head 5 is covered by a further row of water jets from the spray head 3. This avoids flashback of gas or vapour to the runner 2. The propulsion water of the nozzle head 5 and the water jet of the spray head 3 drives the slag and the gas flowing into the spray head into the water of the receiver 6.

Under the influence of the propulsion jet, the slag is granulated into relatively fine small grains. After the receiver 6, the resulting granules/water mixture is passed via a discharge line 18, which preferably has a gradient, to a dewatering device 19. The dewatering device 19 can consist of one or more silo containers, in which the granules settle. However, the dewatering can also be carried out in dewatering machines (not shown) (for example by means of bucket wheels).

Above the receiver 6, a condenser 9 is provided, spray nozzles 10 being arranged in the form of rows in the wall thereof. The condenser 9 is provided with an exhaust 13 in which a vapor barrier plate 12 is provided.

Below the spray nozzle rows 10, one or more water collection channels 11 are arranged, from which the condensate water is passed via a water recycle line 21 to a water recooler (not shown).

The spray nozzles 10 are provided with process water via a spray water line 20.

The feed of propulsion water into the injector 4 or nozzle head 5 and spray head 3 is effected via the propulsion water feed line 8.

The condenser 9 has a top end 15 to which a recycle line 14 is connected which recycles the residual gas from the condenser 9 back to the injector 4. A restrictor flap 16 as well as a reduced-pressure valve 17 are provided in the recycle line 14.

The process water is circulated, vaporization losses and the losses due to the residual moisture remaining in the granules being made up. A steady closed gas circulation is likewise established.

Figure 2:
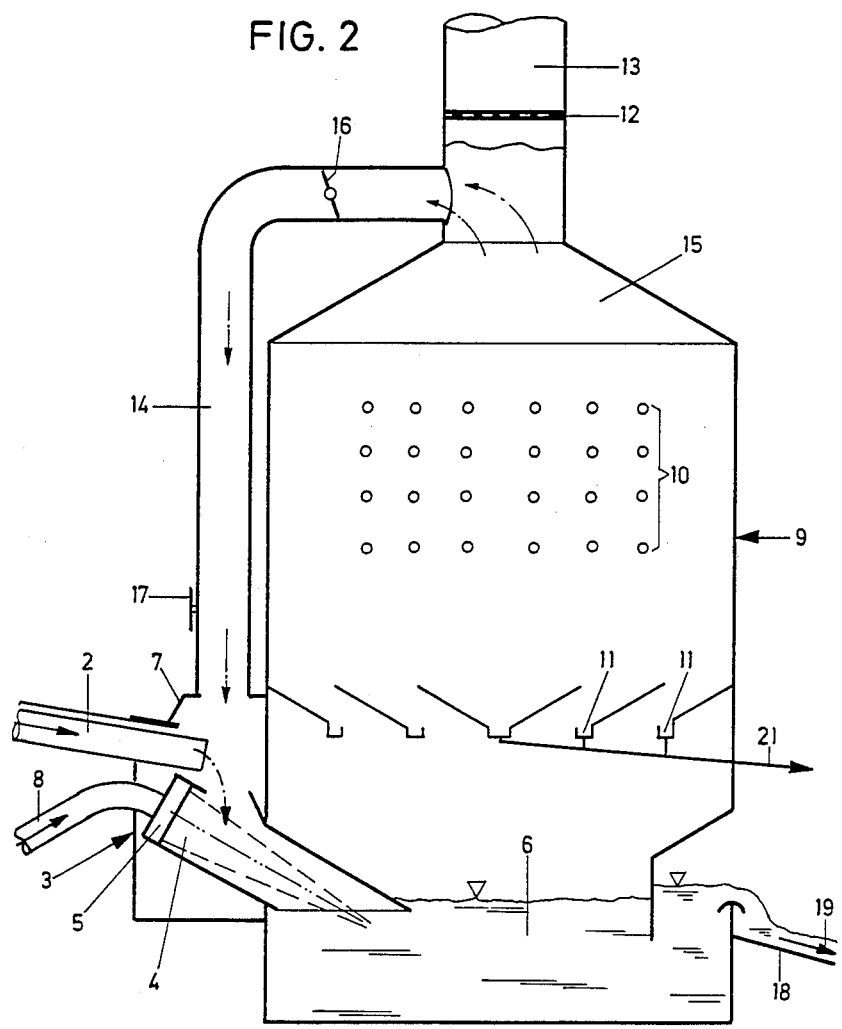
FIG. 2 shows a diagram of equipment for granulation.

The novel process and the mode of action of the novel granulation device are explained in more detail by reference to FIG. 2 which diagrammatically shows a cross-section of such a granulation device.

The slag granulation is effected by subjecting the molten slag at about 1500° C., coming from the slag runner 2, in the injector 4 to a propulsion jet formed by many individual jets and processing it to fine granules. The propulsion jet then present is composed of the slag granules, of water, water vapor and a little air. The water vapor formed on quenching of the slag contains fractions of $H_2S$ and $SO_2$.

The propulsion jet interspersed with water vapour, granules and the sulphur emissions is blown directly into the water receiver 6. This results in intensive mixing and increased heat release. The residual vapor still remaining and the $H_2S$ and $SO_2$ fractions not yet washed out are cooled in the condenser 9 in countercurrent with spray water from the nozzles 10 and condensed. The gaseous sulphur emissions are absorbed by the water and discharged via the cooling water, being bonded to the calcium present therein.

The residual gas remaining after the vapor condensation and consisting of air and residual traces of $H_2S$ and $SO_2$ is taken off at the top end 15 of the condenser 9 and recycled via the recycle line 14 back to the injector 4.

The slag runner 2 is provided with a cover hood 7. A static reduced pressure is established under this cover hood 7.

The impulse of the propulsion jet and of the water jets from the spray head 3 is selected to be of such magnitude that the gas flowing in from the recycle line 14 in the injector is, including the slag, driven into the water of the receiver 6. In the interior of the condenser 9, a wall is provided which reaches down into the water receiver 6 and forms a water seal, whereby outflow of gas and vapor is prevented, and the reduced pressure within the condenser 9 is maintained.

In the receiver 6, the slag mixes with the propulsion water, a corresponding heat interchange taking place. If the slag flow is small, the water temperature in the receiver 6 remains below the boiling point. If the slag inflow is large, a part of the water vaporizes in the receiver 6. This vapor and the gas delivered by the injector into the receiver 6 rise and flow through the water collection channels 11 into the condenser space. A mist of the spray water fed through the nozzles 10 is formed and mixed with the rising gas/vapour stream. Here too, heat interchange and mass transfer thus take place between the gas/vapor stream and the spray water. The vapour is thus condensed and washed out with the spray water dropping down and passed on via the water collection channels 11 and the water recycle lines 21 to the water recooler. Any residual gas which may rise further is collected together with a residual fraction of vapor in the condenser top 15 and passed via the recycle line 14 back to the injector 4.

To prevent any implosion in the event of operating faults, a reduced-pressure valve 17 is provided in the recycle line 14.

During the start-up procedure, the temperature in the condenser 9 is equal to the ambient temperature. After the propulsion water and the spray water have been turned on, the temperature of the air present in the condenser 9 rises to the temperature of the water. The air present in the condenser thus expands isobarically. The corresponding volume flows via the vapour barrier plate 12, acting as a valve, into the exhaust 13 and from there into the open atmosphere. This outflowing air is free of any pollutants.

The gaseous sulphur emissions as $H_2S$ and $SO_2$ are virtually completely separated out or precipitated by driving the slag/propulsion water mixture into the water of the receiver 6 below the surface thereof and by the condensation in the condenser 9 due to the spray water of the nozzles 10. The remaining residual quantities are recycled to the process through the recycle line 14 in closed circulation, so that no emissions of pollutants can escape into the open atmosphere. The parts of the granulation unit downstream of the granulation device, such as, for example, warm water tanks, cooling towers, cold water tanks, loading installations and the like, are not explained in more detail, these can be provided. Neither are the required pumps, valves and the like shown in the drawings.

However, the invention is not restricted to the illustrated embodiments or process steps shown and described. It also comprises all modifications, further developments and simplifications, made by a person skilled in the art, as well as partial combinations and subcombinations of the features and operations described.

What is claimed is:

1. A process for the production of slag sand from blast furnace slag, said process comprising the steps of:
   propelling a mixture steam of water and slag directly into a granules/water receiving tank, at a sufficiently high impulse to intensely mix the contents of said receiver, by jetting water from a spray head into a stream of blast furnace slag, said jetting also granulating said slag;
   feeding the intensely mixed contents of said receiving tank to a downstream dewatering unit;
   transferring dewatered granules from said dewatering unit to a distribution unit;
   returning process water from said dewatering unit to said spray head after making up for losses caused by vaporization and residual moisture remaining in the granules;
   condensing and washing, in a space above said receiving tank, at least part of said vapor and gases formed by said granulation;
   recycling residual gases and vapor from said condensing and washing step back to said spray head.

2. A process according to claim 1, condensate of $H_2S$ and $SO_2$ of said vapor and gas is collected in a water interceptor above said first part of the granules water mixture receiver and fed to the water circulation.

3. A process according to claim 1, characterized in that a positive pressure is maintained in a condensing space below a plane of said jetting and a reduced pressure is maintained above the jetting plane.

4. A process according to claim 1, characterized in that the granules/water mixture formed is fed to at least one silo container.

5. A device for the production of blast furnace slag, comprising:
   an injector;
   a slag runner for feeding blast furnace slag to said injector;
   a granules/water receiving tank;
   a dewatering means downstream of said receiving tank;
   a stack, above said receiving tank, for condensing vapors and fumes formed during granulation, said stack including an exhaust having a plate valve therein, spray nozzles below said plate valve for spraying the vapors and fumes, and a recycle line between said plate valve and said spray nozzles for recycling residual gas to said injector;
   said injector including jetting means for jetting water into said blast furnace slag so as to transform said blast furnace slag into a mixture stream of granules and water, said jetting means including propelling means for propelling said mixture stream of granules and water directly into said receiving tank at a sufficiently large impulse to intensely mix the contents of said receiving tank; and
   means for transferring the intensely mixed contents of said receiving tank to said dewatering means.

6. A device according to claim 5, wherein a restrictor flap is provided in the recycle line.

7. A device according to claim 5 wherein a reduced-pressure valve is fitted in the recycle line.

8. A device according to claim 5, including at least one water collection channel in the stack for collecting condensate of said vapors and fumes.

9. A device according to claim 5, wherein the spray nozzles are fitted in several rows one above the other on a shell of the stack.

10. The method of claim 1, comprising providing the water from the spray head with sufficient impulse so that the granules/water mixture is driven below the surface of said water in said receiving tank.

11. The method of claim 10, comprising maintaining a reduced pressure in the vicinity of said spray head for said recycling of said residual gas.

12. The device of claim 5, wherein said granules collection vessel comprises a reservoir of water below the surface of which said water being jetted from said spray head, along with said slag being granulated, is driven as an impulse jet, as a result of the combination of said injector and said receiving tank.

13. The device of claim 12, comprising means for maintaining at a reduced pressure a volume above said injector, for providing said recycling of said residual gas to be carried by said impulse jet into said receiving tank.

14. A device for producing slag sand, comprising
   a slag runner for providing slag from a blast furnace,
   an injector means for defining a first jetting water into said slag from said slag runner, said injector including a means for defining a first space thereover for returning gas,
   a receiving means with a reservoir of water for receiving said water from said injector and said slag, said receiving means including means defining a second space above and extending into the surface of said reservoir wherein said water and slag are received,
   a stack with condensing and spraying means connected between said first and second spaces,
   wherein said slag with said jetted water is driven below the surface of said reservoir in the production of said slag sand, and gas released from said slag during said production of said slag sand is condensed and sprayed by said condensing and spraying means, and residual gas remaining after said condensing and spraying is returned to said first space of said injector.

* * * * *